US010024643B2

(12) United States Patent
Steele et al.

(10) Patent No.: US 10,024,643 B2
(45) Date of Patent: *Jul. 17, 2018

(54) TAPE MEASURE

(71) Applicant: Milwaukee Electric Tool Corporation, Brookfield, WI (US)

(72) Inventors: Michael S. Steele, Pewaukee, WI (US); Steven W. Hyma, Milwaukee, WI (US); Wade F. Burch, Wauwatosa, WI (US); Cheng Zhang Li, Sussex, WI (US); Scott R. Fischer, Menomonee Falls, WI (US); Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/236,611

(22) Filed: Aug. 15, 2016

(65) Prior Publication Data
US 2016/0349031 A1    Dec. 1, 2016

Related U.S. Application Data

(63) Continuation of application No. 14/463,177, filed on Aug. 19, 2014, now Pat. No. 9,417,046, which is a
(Continued)

(51) Int. Cl.
*G01B 3/10* (2006.01)

(52) U.S. Cl.
CPC ......... *G01B 3/1041* (2013.01); *G01B 3/1005* (2013.01); *G01B 3/1056* (2013.01); *G01B 3/1084* (2013.01); *G01B 2003/102* (2013.01)

(58) Field of Classification Search
CPC ...... G01B 3/10; G01B 3/1056; G01B 3/1071; G01B 3/1084
(Continued)

(56) References Cited

U.S. PATENT DOCUMENTS 14,947 A    5/1856   Buck et al.
1,303,756 A    5/1919   Ballou
(Continued)

FOREIGN PATENT DOCUMENTS

CN         2174684          8/1994
DE    102006058396 A1       7/2008
(Continued)

OTHER PUBLICATIONS

Hyun-Kyu Ko, "A Study on Design of Measure Tape for Home Use (for DYI)" (1996) Master's Thesis—Kyung Sung University, Graduate School of Industry, Department of Industrial Design, 658.04 4 (81 pages with English translation).

*Primary Examiner* — G. Bradley Bennett
(74) *Attorney, Agent, or Firm* — Reinhart Boerner Van Deuren s.c.

(57) ABSTRACT

A tape measure including a housing arranged to enclose an internal cavity, where the housing defines a front wall. A port is formed in the housing and spaced a non-zero distance from the front wall. A measuring tape is at least partially disposed within the internal cavity of the housing and extends through the port. The measuring tape is rotatably coupled to the housing. A finger guard assembly is positioned adjacent the front wall, such that the finger guard assembly cooperates with the port to define a space therebetween. The measuring tape passes through the space outside of the housing to facilitate the control of the retraction and extension of the measuring tape through contact within the space.

20 Claims, 3 Drawing Sheets

Related U.S. Application Data continuation of application No. 13/561,773, filed on Jul. 30, 2012, now Pat. No. 8,806,770.

(60) Provisional application No. 61/656,297, filed on Jun. 6, 2012, provisional application No. 61/607,060, filed on Mar. 6, 2012, provisional application No. 61/513,283, filed on Jul. 29, 2011.

(58) Field of Classification Search
USPC ................. 33/759, 760, 761, 768, 769, 770
See application file for complete search history.

(56) References Cited

U.S. PATENT DOCUMENTS

| | | |
|---|---|---|
| 1,613,676 A | 1/1927 | Raphael |
| 2,052,259 A | 8/1936 | Stowell |
| 2,156,905 A | 5/1939 | Stowell et al. |
| 2,574,272 A | 11/1951 | McCully |
| 2,614,769 A | 10/1952 | Nicholson |
| 2,676,374 A | 4/1954 | Ballard |
| 2,683,933 A | 7/1954 | McFarland |
| 2,809,142 A | 10/1957 | Sellen et al. |
| 2,816,369 A | 12/1957 | Becker |
| 2,994,958 A | 8/1961 | Beeber |
| 3,100,937 A | 8/1963 | Burch |
| 3,164,907 A | 1/1965 | Quenot |
| 3,205,584 A | 9/1965 | Overaa |
| 3,214,836 A | 11/1965 | West |
| 3,499,225 A | 3/1970 | Darrah |
| 3,519,219 A | 7/1970 | Zelnick |
| 3,519,220 A | 7/1970 | Zelnick |
| 3,521,831 A | 7/1970 | Schmidt |
| 3,577,641 A | 5/1971 | Smith |
| 3,578,259 A | 5/1971 | Zelnick |
| 3,601,896 A | 8/1971 | Ledene |
| 3,672,597 A | 6/1972 | Williamson |
| 3,713,603 A | 1/1973 | Shore |
| 3,838,520 A | 10/1974 | Quenot |
| 3,874,608 A | 4/1975 | Quenot |
| 4,103,426 A | 8/1978 | Robin |
| 4,121,785 A | 10/1978 | Quenot |
| 4,131,244 A | 12/1978 | Quenot |
| 4,149,320 A | 4/1979 | Troyer et al. |
| 4,164,816 A | 8/1979 | Bergkvist |
| 4,186,490 A | 2/1980 | Quenot |
| 4,288,923 A | 9/1981 | Duda |
| 4,363,171 A | 12/1982 | Scandella |
| 4,433,486 A | 2/1984 | Muehlenbein |
| 4,462,160 A | 7/1984 | Cohen |
| 4,476,635 A | 10/1984 | Hart |
| 4,479,617 A | 10/1984 | Edwards |
| 4,489,494 A | 12/1984 | Duda |
| 4,516,325 A | 5/1985 | Cohen et al. |
| 4,527,334 A | 7/1985 | Jones et al. |
| 4,547,969 A | 10/1985 | Haack |
| 4,603,481 A | 8/1986 | Cohen et al. |
| 4,748,746 A | 6/1988 | Jacoff |
| 4,811,489 A | 3/1989 | Walker |
| 4,860,901 A | 8/1989 | Hochreuther et al. |
| 4,930,227 A | 6/1990 | Ketchpel |
| 4,965,941 A | 10/1990 | Agostinacci |
| 4,998,356 A | 3/1991 | Chapin |
| 4,999,924 A | 3/1991 | Shields |
| 5,010,657 A | 4/1991 | Knapp |
| 5,038,985 A | 8/1991 | Chapin |
| 5,046,339 A | 9/1991 | Krell |
| 5,062,215 A | 11/1991 | Schlitt |
| 5,134,784 A | 8/1992 | Atienza |
| D333,628 S | 3/1993 | Piotrkowski |
| 5,189,801 A | 3/1993 | Nicely |
| 5,208,767 A | 5/1993 | George-Kelso et al. |
| 5,210,956 A | 5/1993 | Knispel et al. |
| 5,230,158 A | 7/1993 | Wall |
| D342,210 S | 12/1993 | Grossman |
| D342,459 S | 12/1993 | Shen |
| D342,687 S | 12/1993 | Kang |
| 5,335,421 A | 8/1994 | Jones, Jr. |
| D350,703 S | 9/1994 | Fifer |
| 5,367,785 A | 11/1994 | Benarroch |
| 5,448,837 A | 9/1995 | Han-Teng |
| D365,769 S | 1/1996 | Kang |
| 5,481,813 A | 1/1996 | Templeton |
| 5,506,378 A | 4/1996 | Goldenberg |
| 5,531,395 A | 7/1996 | Hsu |
| 5,542,184 A | 8/1996 | Beard |
| D375,269 S | 11/1996 | Wertheim et al. |
| 5,575,077 A | 11/1996 | Jung Tae |
| 5,600,894 A | 2/1997 | Blackman et al. |
| 5,659,970 A | 8/1997 | Reedy |
| 5,699,623 A | 12/1997 | Lee |
| 5,746,004 A | 5/1998 | Wertheim |
| D396,816 S | 8/1998 | Kang |
| D397,304 S | 8/1998 | Kang |
| 5,791,581 A | 8/1998 | Loeffler et al. |
| 5,794,357 A | 8/1998 | Gilliam et al. |
| D397,626 S | 9/1998 | Davis |
| D397,950 S | 9/1998 | Blackman et al. |
| 5,806,202 A | 9/1998 | Blackman et al. |
| 5,809,662 A | 9/1998 | Skinner |
| 5,815,940 A | 10/1998 | Valentine, Sr. |
| 5,820,057 A | 10/1998 | Decarolis et al. |
| 5,829,152 A | 11/1998 | Potter et al. |
| D402,216 S | 12/1998 | Gilliam et al. |
| 5,842,284 A | 12/1998 | Goldman |
| 5,845,412 A | 12/1998 | Arcand |
| 5,875,557 A | 3/1999 | Ueki |
| 5,884,408 A | 3/1999 | Simmons |
| 5,894,677 A | 4/1999 | Hoffman |
| 5,895,539 A | 4/1999 | Hsu |
| D409,104 S | 5/1999 | Yang |
| 5,913,586 A | 6/1999 | Marshall |
| 5,922,999 A | 7/1999 | Yang |
| D412,858 S | 8/1999 | Staton |
| 5,990,435 A | 11/1999 | Chao |
| 6,011,472 A | 1/2000 | Pendergraph et al. |
| D420,606 S | 2/2000 | Hsu |
| D421,230 S | 2/2000 | Gilliam et al. |
| 6,026,585 A | 2/2000 | Li |
| 6,032,379 A | 3/2000 | Usami |
| D423,382 S | 4/2000 | Piotrkowski |
| 6,052,914 A | 4/2000 | Soon |
| D424,454 S | 5/2000 | Ikeda |
| 6,082,017 A | 7/2000 | Simar |
| 6,085,433 A | 7/2000 | Li |
| 6,098,303 A | 8/2000 | Vogel |
| 6,108,926 A | 8/2000 | Fraser et al. |
| 6,115,933 A | 9/2000 | Li |
| RE36,887 E | 10/2000 | Goldman |
| 6,148,534 A | 11/2000 | Li |
| 6,161,299 A | 12/2000 | Lin |
| 6,167,635 B1 | 1/2001 | Lin |
| 6,178,655 B1 | 1/2001 | Potter et al. |
| D438,478 S | 3/2001 | Lin |
| D439,531 S | 3/2001 | Davis et al. |
| 6,209,219 B1 | 4/2001 | Wakefield et al. |
| D441,308 S | 5/2001 | Davis |
| D442,076 S | 5/2001 | Swanson |
| 6,237,243 B1 | 5/2001 | Cook |
| RE37,212 E | 6/2001 | Marshall et al. |
| 6,243,964 B1 | 6/2001 | Murray |
| 6,249,986 B1 | 6/2001 | Murray |
| D447,069 S | 8/2001 | Budrow |
| 6,272,764 B1 | 8/2001 | Lin |
| 6,276,071 B1 | 8/2001 | Khachatoorian |
| D447,712 S | 9/2001 | Hsu |
| 6,282,808 B1 | 9/2001 | Murray |
| 6,308,432 B1 | 10/2001 | Gilliam et al. |
| D451,041 S | 11/2001 | Chen |
| 6,324,769 B1 | 12/2001 | Murray |
| 6,338,204 B1 | 1/2002 | Howle |
| D453,303 S | 2/2002 | Lin |
| 6,349,482 B1 | 2/2002 | Gilliam |
| 6,367,161 B1 | 4/2002 | Murray et al. |

(56) References Cited

U.S. PATENT DOCUMENTS

| | | |
|---|---|---|
| D458,163 S | 6/2002 | Kang |
| D458,550 S | 6/2002 | Hsu |
| 6,431,486 B1 | 8/2002 | Lee |
| D463,300 S | 9/2002 | Li |
| 6,442,863 B1 | 9/2002 | Poineau et al. |
| 6,449,866 B1 | 9/2002 | Murray |
| D464,277 S | 10/2002 | Traver, III |
| D464,579 S | 10/2002 | Martone |
| 6,470,582 B1 | 10/2002 | Renko |
| 6,470,590 B1 | 10/2002 | Lee |
| 6,490,809 B1 | 12/2002 | Li |
| 6,497,050 B1 | 12/2002 | Ricalde |
| 6,499,226 B1 | 12/2002 | Reda et al. |
| D469,704 S | 2/2003 | Williams et al. |
| RE38,032 E | 3/2003 | Butwin |
| D471,473 S | 3/2003 | Blackman et al. |
| D471,827 S | 3/2003 | Ranieri et al. |
| 6,530,159 B2 | 3/2003 | Traver, III |
| 6,543,144 B1 | 4/2003 | Morin |
| 6,546,644 B2 | 4/2003 | Poineau et al. |
| D474,412 S | 5/2003 | Ichinose et al. |
| 6,568,099 B2 | 5/2003 | Bergeron |
| D476,913 S | 7/2003 | Blackman et al. |
| 6,595,451 B1 | 7/2003 | Kang et al. |
| 6,598,310 B1 | 7/2003 | Odachowski |
| 6,637,124 B2 | 10/2003 | Pederson |
| 6,637,126 B2 | 10/2003 | Balota |
| 6,643,947 B2 | 11/2003 | Murray |
| D485,770 S | 1/2004 | Lee |
| D486,086 S | 2/2004 | Jueneman |
| 6,684,522 B2 | 2/2004 | Chilton |
| 6,688,010 B1 | 2/2004 | Schwaerzler |
| 6,691,426 B1 | 2/2004 | Lee et al. |
| 6,694,622 B2 | 2/2004 | Kim |
| 6,698,679 B1 | 3/2004 | Critelli et al. |
| 6,718,649 B1 | 4/2004 | Critelli et al. |
| 6,760,979 B1 | 7/2004 | Hsu |
| 6,796,052 B1 | 9/2004 | Lin |
| 6,804,899 B2 | 10/2004 | Murray |
| 6,811,109 B1 | 11/2004 | Blackman et al. |
| 6,836,975 B2 | 1/2005 | Lin |
| 6,839,981 B2 | 1/2005 | Rafter |
| 6,854,197 B2 | 2/2005 | Knight |
| D503,351 S | 3/2005 | Chen |
| D503,637 S | 4/2005 | Noel |
| D503,897 S | 4/2005 | Lin |
| 6,874,245 B2 | 4/2005 | Liu |
| D504,628 S | 5/2005 | Weeks et al. |
| D504,835 S | 5/2005 | Snider |
| D504,836 S | 5/2005 | Wang |
| 6,892,468 B2 | 5/2005 | Murray |
| 6,904,697 B2 | 6/2005 | Zars |
| D507,195 S | 7/2005 | Kondo et al. |
| 6,918,191 B2 | 7/2005 | Stauffer et al. |
| 6,920,700 B2 | 7/2005 | Ekdahl et al. |
| 6,931,734 B2 | 8/2005 | Elder et al. |
| 6,931,753 B2 | 8/2005 | Ryals et al. |
| 6,935,045 B2 | 8/2005 | Cubbedge |
| 6,938,354 B2 | 9/2005 | Worthington |
| 6,944,961 B2 | 9/2005 | Carroll |
| 6,959,499 B2 | 11/2005 | Bini |
| 6,962,002 B2 | 11/2005 | Panosian |
| D514,962 S | 2/2006 | Armendariz |
| 6,996,915 B2 | 2/2006 | Ricalde |
| 7,024,791 B2 | 4/2006 | Marshall et al. |
| D522,890 S | 6/2006 | Huang |
| 7,055,260 B1 | 6/2006 | Hoffman |
| 7,057,484 B2 | 6/2006 | Gilmore |
| 7,059,061 B2 | 6/2006 | French |
| 7,086,174 B2 | 8/2006 | Scarborough |
| 7,131,214 B1 | 11/2006 | Blackman et al. |
| 7,131,215 B2 | 11/2006 | Kang |
| D535,900 S | 1/2007 | McKinney |
| 7,159,331 B2 | 1/2007 | Critelli et al. |
| 7,168,182 B2 | 1/2007 | Kilpatrick et al. |
| 7,174,655 B1 | 2/2007 | Gibbons et al. |
| 7,174,656 B1 | 2/2007 | Smith |
| 7,178,257 B2 | 2/2007 | Kang et al. |
| 7,185,446 B1 | 3/2007 | King |
| D540,207 S | 4/2007 | Ikeda et al. |
| 7,234,246 B1 | 6/2007 | Rhead |
| RE39,719 E | 7/2007 | Murray |
| D545,701 S | 7/2007 | Cooper |
| D547,681 S | 7/2007 | Nelson et al. |
| 7,240,439 B2 | 7/2007 | Critelli et al. |
| 7,266,905 B1 | 9/2007 | Lee |
| 7,284,339 B1 | 10/2007 | Campbell et al. |
| 7,299,565 B2 | 11/2007 | Marshall et al. |
| D557,155 S | 12/2007 | Sa'ar |
| D558,620 S | 1/2008 | Critelli et al. |
| D560,522 S | 1/2008 | Farnworth et al. |
| 7,334,344 B2 | 2/2008 | Scarborough |
| 7,343,694 B2 | 3/2008 | Erdfarb |
| D565,441 S | 4/2008 | Critelli |
| D565,442 S | 4/2008 | Critelli |
| 7,363,723 B1 | 4/2008 | Peterson |
| 7,377,050 B2 | 5/2008 | Shute et al. |
| 7,398,604 B2 | 7/2008 | Murray |
| 7,406,778 B2 | 8/2008 | Lee et al. |
| 7,415,777 B2 | 8/2008 | Campbell et al. |
| 7,415,778 B1 | 8/2008 | McEwan et al. |
| D579,359 S | 10/2008 | Critelli et al. |
| 7,434,330 B2 | 10/2008 | McEwan et al. |
| 7,454,845 B2 | 11/2008 | Wise |
| D582,810 S | 12/2008 | Cook |
| 7,458,537 B2 | 12/2008 | Critelli et al. |
| 7,475,842 B2 | 1/2009 | Campbell |
| 7,487,600 B1 | 2/2009 | Cooper |
| 7,490,414 B2 | 2/2009 | Critelli et al. |
| 7,490,415 B1 | 2/2009 | Cubbedge |
| D590,283 S | 4/2009 | Critelli et al. |
| D590,284 S | 4/2009 | Critelli et al. |
| 7,555,845 B2 | 7/2009 | Critelli et al. |
| 7,559,154 B2 | 7/2009 | Levine et al. |
| 7,565,751 B2 | 7/2009 | Murray |
| 7,594,341 B2 | 9/2009 | Erdfarb |
| D603,248 S | 11/2009 | Bar-Erez |
| 7,617,616 B1 | 11/2009 | Berg |
| 7,627,958 B2 | 12/2009 | Tallon et al. |
| 7,631,437 B2 | 12/2009 | Sanderson |
| D611,849 S | 3/2010 | Cook et al. |
| 7,669,347 B1 | 3/2010 | Huang |
| D613,629 S | 4/2010 | Suzuki |
| D614,516 S | 4/2010 | Capra |
| 7,703,216 B2 | 4/2010 | Huang |
| D617,224 S | 6/2010 | Delneo et al. |
| 7,805,855 B2 | 10/2010 | Seo |
| 7,845,093 B2 | 12/2010 | Smiroldo |
| 7,846,673 B2 | 12/2010 | Pastorek et al. |
| 7,854,074 B2 | 12/2010 | Zhou |
| 7,913,406 B2 | 3/2011 | Norelli |
| 7,918,037 B1 | 4/2011 | Polkhovskiy |
| 7,987,611 B2 | 8/2011 | Taylor |
| 8,015,723 B2 | 9/2011 | Solomon |
| 8,056,849 B2 | 11/2011 | Ng et al. |
| 8,081,815 B2 | 12/2011 | Kotake |
| D653,974 S | 2/2012 | Capra |
| 8,117,762 B2 | 2/2012 | Delneo et al. |
| 8,117,763 B2 | 2/2012 | Delneo et al. |
| D660,735 S | 5/2012 | Petrillo |
| 8,215,027 B2 | 7/2012 | Kang |
| 8,375,595 B2 | 2/2013 | Murray et al. |
| 8,381,411 B2 | 2/2013 | Delarosa et al. |
| 8,407,909 B2 | 4/2013 | Lindsay |
| 8,468,710 B1 | 6/2013 | Mos |
| 8,806,770 B2 * | 8/2014 | Steele .................. G01B 3/1005 33/761 |
| 8,898,922 B2 | 12/2014 | Bridges et al. |
| 9,417,046 B2 * | 8/2016 | Steele .................. G01B 3/1005 |
| 2001/0003872 A1 | 6/2001 | Pederson |
| 2001/0042315 A1 | 11/2001 | Dixon |
| 2002/0011008 A1 | 1/2002 | Nelson et al. |
| 2002/0066193 A1 | 6/2002 | Hodge |
| 2002/0066774 A1 | 6/2002 | Prochac |

(56) References Cited

U.S. PATENT DOCUMENTS

| | | |
|---|---|---|
| 2002/0073570 A1 | 6/2002 | Conder |
| 2003/0009899 A1 | 1/2003 | Ha |
| 2003/0019116 A1 | 1/2003 | DeWall |
| 2003/0019123 A1 | 1/2003 | Lin |
| 2003/0070315 A1 | 4/2003 | Bergeron |
| 2003/0213141 A1 | 11/2003 | Lin |
| 2003/0233762 A1 | 12/2003 | Blackman et al. |
| 2004/0044438 A1 | 3/2004 | Lorraine et al. |
| 2004/0055174 A1 | 3/2004 | Hirsch, Jr. |
| 2004/0071869 A1 | 4/2004 | Gilliam et al. |
| 2004/0088875 A1 | 5/2004 | Lee et al. |
| 2004/0163267 A1 | 8/2004 | Bini |
| 2004/0163271 A1 | 8/2004 | Zars |
| 2004/0163272 A1 | 8/2004 | Knight |
| 2005/0005470 A1 | 1/2005 | Snider |
| 2005/0028396 A1 | 2/2005 | Stauffer et al. |
| 2005/0155244 A1 | 7/2005 | Ryals et al. |
| 2005/0155245 A1 | 7/2005 | Panosian |
| 2005/0252020 A1 | 11/2005 | Critelli et al. |
| 2005/0252021 A1 | 11/2005 | Kang |
| 2006/0005417 A1 | 1/2006 | Rhead |
| 2006/0010705 A1 | 1/2006 | Dettellis |
| 2006/0096112 A1 | 5/2006 | Berring |
| 2006/0096113 A1 | 5/2006 | Kang et al. |
| 2006/0107546 A1 | 5/2006 | Pritchard |
| 2006/0112582 A1 | 6/2006 | Scarborough |
| 2006/0130352 A1 | 6/2006 | Huang |
| 2006/0185185 A1 | 8/2006 | Scarborough |
| 2006/0230627 A1 | 10/2006 | Blackman et al. |
| 2006/0248742 A1 | 11/2006 | Marshall et al. |
| 2006/0283036 A1 | 12/2006 | Huang |
| 2007/0017111 A1 | 1/2007 | Hoback et al. |
| 2007/0056182 A1 | 3/2007 | Di Bitonto et al. |
| 2007/0079520 A1 | 4/2007 | Levine et al. |
| 2007/0152091 A1 | 7/2007 | Campbell |
| 2007/0171630 A1 | 7/2007 | Gibbons et al. |
| 2007/0227028 A1 | 10/2007 | Campbell et al. |
| 2008/0028628 A1 | 2/2008 | Campbell et al. |
| 2008/0086902 A1 | 4/2008 | Murray |
| 2008/0086903 A1 | 4/2008 | Peterson |
| 2008/0086904 A1 | 4/2008 | Murray |
| 2008/0098610 A1 | 5/2008 | Lipps |
| 2008/0168674 A1 | 7/2008 | Nielson |
| 2008/0285854 A1 | 11/2008 | Kotake et al. |
| 2009/0064517 A1 | 3/2009 | Sanderson |
| 2009/0064525 A1 | 3/2009 | Chen |
| 2009/0064526 A1 | 3/2009 | Farnworth et al. |
| 2009/0249636 A1 | 10/2009 | Reda et al. |
| 2010/0139110 A1 | 6/2010 | Germain |
| 2010/0314277 A1 | 12/2010 | Murray |
| 2010/0325910 A1 | 12/2010 | Huang |
| 2011/0005094 A1 | 1/2011 | Solomon |
| 2011/0138642 A1 | 6/2011 | Norelli |
| 2011/0179661 A1 | 7/2011 | Delneo et al. |
| 2011/0179663 A1 | 7/2011 | Kang |
| 2011/0179664 A1 | 7/2011 | Delneo et al. |
| 2012/0036727 A1 | 2/2012 | McCarthy |
| 2012/0055038 A1 | 3/2012 | Lindsay |
| 2012/0073156 A1 | 3/2012 | DeLaRosa et al. |
| 2012/0159799 A1 | 6/2012 | Murray et al. |
| 2012/0167403 A1 | 7/2012 | Roeske |
| 2012/0240419 A1 | 9/2012 | Wagner |
| 2013/0025147 A1 | 1/2013 | Steele et al. |
| 2013/0047455 A1 | 2/2013 | Steele et al. |
| 2013/0185949 A1 | 7/2013 | Burch et al. |
| 2013/0298417 A1 | 11/2013 | Huang |
| 2015/0047216 A1 | 2/2015 | Burch et al. |
| 2015/0268024 A1 | 9/2015 | Brossard |

FOREIGN PATENT DOCUMENTS

| | | |
|---|---|---|
| DE | 102006058396 B4 | 6/2011 |
| EP | 66322 | 10/1986 |
| EP | 531570 | 3/1993 |
| EP | 427932 | 2/1996 |
| EP | 724133 | 7/1996 |
| EP | 0896200 A2 | 2/1999 |
| EP | 0896200 A3 | 12/1999 |
| EP | 1175840 | 1/2002 |
| EP | 1411319 | 4/2004 |
| EP | 1144947 | 9/2004 |
| EP | 1237431 | 10/2006 |
| EP | 2469218 | 6/2012 |
| GB | 690458 | 4/1953 |
| JP | 1961002384 | 2/1961 |
| JP | 1983134704 | 9/1983 |
| JP | 10332301 | 12/1998 |
| KR | 19840001901 | 9/1984 |
| KR | 19910004712 | 11/1991 |
| WO | WO 199402799 | 2/1994 |
| WO | WO 1997014541 | 4/1997 |
| WO | WO 1998011402 | 3/1998 |
| WO | WO 2000060306 | 10/2000 |
| WO | WO 2002057710 | 7/2002 |

* cited by examiner

TAPE MEASURE

CROSS-REFERENCE TO RELATED APPLICATIONS

This application is a continuation of U.S. application Ser. No. 14/463,177, filed Aug. 19, 2014, now U.S. Pat. No. 9,417,046, which is a continuation of U.S. application Ser. No. 13/561,773, filed Jul. 30, 2012, now U.S. Pat. No. 8,806,770, which claims priority to U.S. Provisional Patent Application No. 61/513,283, filed on Jul. 29, 2011, U.S. Provisional Patent Application No. 61/607,060, filed on Mar. 6, 2012, and U.S. Provisional Patent Application No. 61/656,297, filed on Jun. 6, 2012, the entire contents of which are incorporated by reference herein.

BACKGROUND

The present invention relates to measurement devices, and in particular, the invention relates to a tape measure, and more specifically, a tape measure with a guard member.

SUMMARY

In one embodiment, the invention provides a tape measure. The tape measure includes a housing assembly defining a cavity and a tape port from which to extend and retract a measuring tape. The measuring tape forms a spool rotatably coupled about an axis. A hook member is fixedly coupled to an end portion of the measuring tape. A U-shaped guard member extends from the housing assembly adjacent the tape port. The guard member is configured to engage the hook member when the measuring tape is retracted into the housing assembly.

In another embodiment, the invention provides a tape measure. The tape measure includes a housing assembly defining a cavity and a tape port from which to extend and retract a measuring tape. The measuring tape forms a spool rotatably coupled about an axis. A hook member is fixedly coupled to an end portion of the measuring tape. A finger guard assembly extends from the housing assembly adjacent the tape port. The finger guard assembly includes a U-shaped guard member and a guard support member and is configured to engage the hook member when the measuring tape is retracted into the housing assembly.

In another construction, the invention provides a tape measure that includes a housing arranged to substantially enclose an internal cavity, the housing defining a tape port, and a tape positioned partially within the housing, the tape including an end portion that extends through the tape port and out of the housing. A hook is coupled to the end portion and a finger guard assembly is coupled to the housing and spaced apart from the tape port. The end portion extends through an aperture in the finger guard assembly and is movable between a retracted position in which the hook abuts the finger guard assembly and an extended position in which the hook is spaced apart from the finger guard assembly.

In another construction, the invention provides a tape measure that includes a housing arranged to substantially enclose an internal cavity, the housing defining a tape port and a finger guard assembly coupled to the housing and cooperating with the housing to define a finger gap. A tape is positioned partially within the housing and includes an end portion. The tape extends through the tape port, through the finger gap, and through an aperture in the finger guard assembly. A hook is coupled to the end portion and is operable to contact the finger guard assembly to inhibit retraction of the end portion past the finger guard assembly and into the finger gap.

In another construction, the invention provides a tape measure that includes a housing arranged to substantially enclose an internal cavity, the housing defining a tape port, and a finger guard assembly coupled to the housing and defining an opening. A tape is at least partially disposed within the housing. The tape is movable from a retracted position to an extended position by passing substantially linearly through the tape port and the opening. A finger gap is defined between the tape port and the finger guard, wherein a portion of tape within the finger gap is disposed outside of the housing.

In another construction, the invention provides a tape measure including a housing assembly including a first side wall, a second side wall, and a peripheral wall connecting the first side wall and the second side wall. The housing assembly defines an internal cavity. A port is disposed within the peripheral wall of the housing assembly. A spool is disposed within the internal cavity of the housing assembly, and the spool defines an axis of rotation. A measuring tape is at least partially disposed within the internal cavity of the housing assembly and extends through the port. The measuring tape is rotatably coupled to the spool. A hook member is fixed to an end portion of the measuring tape. The measuring tape is movable between a retracted position in, which the hook member is positioned proximate the port, and an extended position, in which the hook member is positioned away from the port. A retraction mechanism is coupled to the spool such that the retraction mechanism is configured to bias the measuring tape towards the retracted position. The tape measure further includes a finger guard assembly, including a guard member and a guard support. The guard support is coupled to the housing assembly and supporting the guard member. The guard member positioned between the port and the hook member.

In another construction, the invention provides a tape measure including a housing arranged to enclose an internal cavity, where the housing defines a front wall. A port is formed in the housing and spaced a non-zero distance from the front wall. A measuring tape is at least partially disposed within the internal cavity of the housing and extends through the port. The measuring tape is rotatably coupled to the housing. A finger guard assembly is positioned adjacent the front wall, such that the finger guard assembly cooperates with the port to define a space therebetween. The measuring tape passes through the space outside of the housing to facilitate the control of the retraction and extension of the measuring tape through contact within the space.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
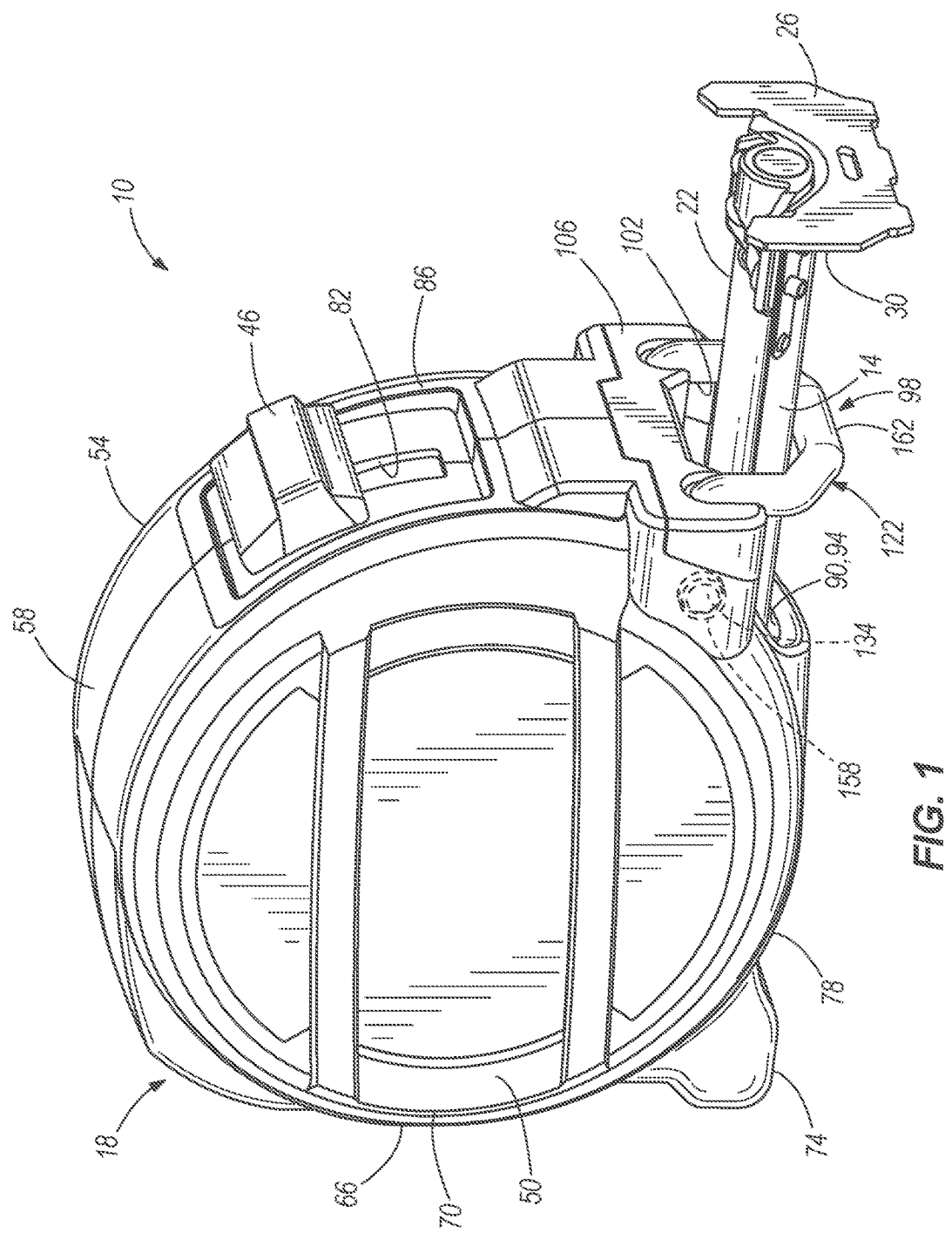
FIG. 1 is a perspective view of a tape measure according to one construction of the invention.
Figure 2:
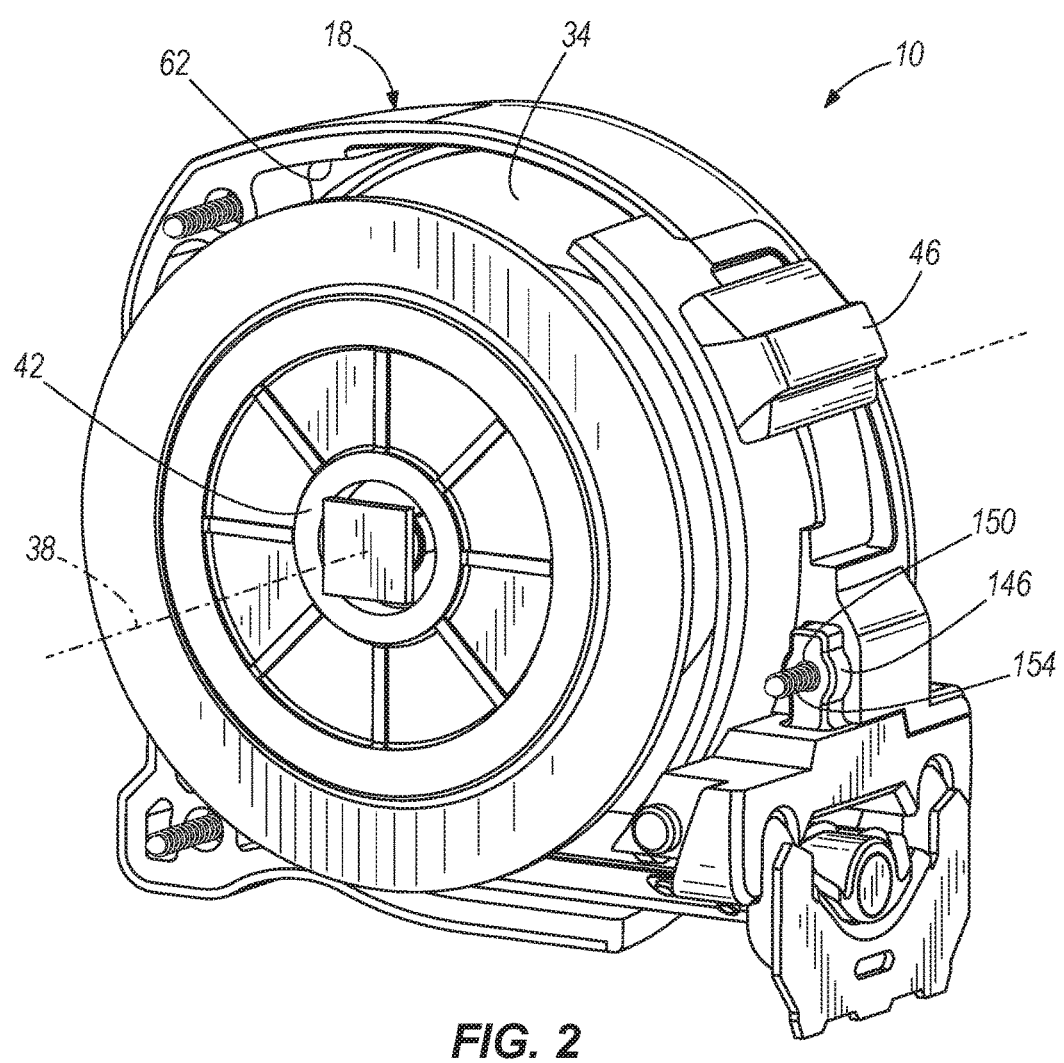
FIG. 2 is a perspective view of the tape measure of FIG. 1 with a first side wall removed.

FIGS. 1 and 2 illustrate a length measurement device, more specifically, a tape measure 10. The tape measure 10 includes a coilable measuring tape 14 and a housing assembly 18.

As illustrated in FIG. 1, a variable-length extended segment 22 of the measuring tape 14 is retractable and extendable from the housing assembly 18. A hook member 26 is fixedly coupled to an end portion 30 of the measuring tape 14. The remainder of the measuring tape 14 forms a spool 34 rotatably disposed about an axis 38 of the tape measure 10 (FIG. 2). As shown in FIG. 2, a retraction mechanism 42 is coupled to the spool 34 to provide for powered retraction of the measuring tape 14. The retraction mechanism 42 may include an elongated coiled spring for motive force. A tape lock 46 is provided to selectively engage measuring tape 14, such that the extended segment 22 of the measuring tape 14 remains at a desired length.

Referring to FIG. 1, the housing assembly 18 includes a first side wall 50, a second side wall 54, and a peripheral wall 58 connecting the first side wall 50 and the second side wall 54. The first side wall 50, second side wall 54, and peripheral wall 58 define an internal cavity 62 (FIG. 2) in which the spool 34 and retraction mechanism 42 are housed. Referring to FIG. 1, each of the first side wall 50 and the second side wall 54 has a substantially circular profile 66. In other embodiments, the side walls may be rectangular, polygonal, or any other desired shape. Portions of the housing assembly 18 may be co-molded or separately formed of a resilient material, such as a natural or synthetic rubber. In the illustrated construction, the housing assembly 18 is formed with housing bumpers 70 and a support leg 74 which extends from a lower portion 78 of the peripheral wall 58.

A slot 82 is defined along a forward portion 86 of the peripheral wall 58. The slot 82 is provided to allow for sliding movement of the tape lock 46 relative to housing assembly 18.

Below the slot 82, a tape port 90 is provided in the peripheral wall 58. The tape port 90 has an arcuate shape 94, corresponding to an arcuate cross-sectional profile of the measuring tape 14. The tape port 90 allows for the retraction and extension of the measuring tape 14 to and from the internal cavity 62 (FIG. 2).

Figure 3:
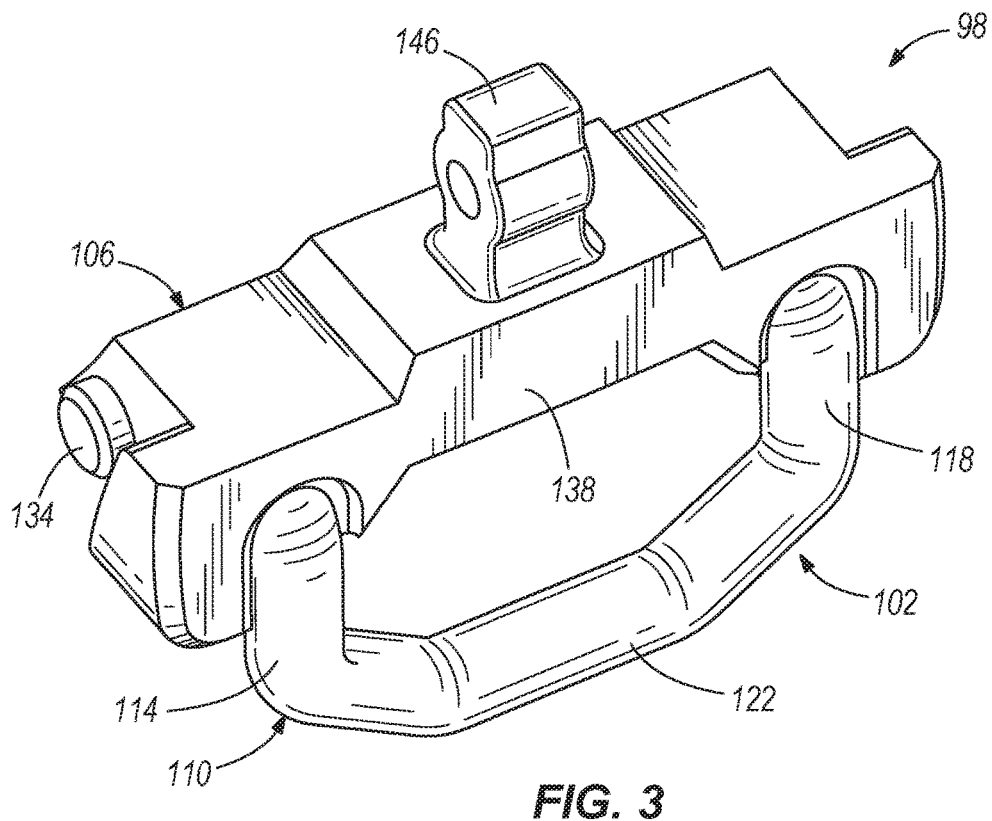
FIG. 3 is a perspective view of a finger guard assembly of the tape measure of FIG. 1.

As shown in FIGS. 1 and 2, the tape measure includes a finger guard assembly 98. Referring to FIG. 3, the finger guard assembly 98 includes a guard member 102 and a guard support member 106. Exposed portions 110 of the guard member 102 are substantially U-shaped, with a first leg 114 and a second leg 118 extending from the guard support member 106, and a connecting leg 122 extending between the first leg 114 and the second leg 118.

Figure 4:
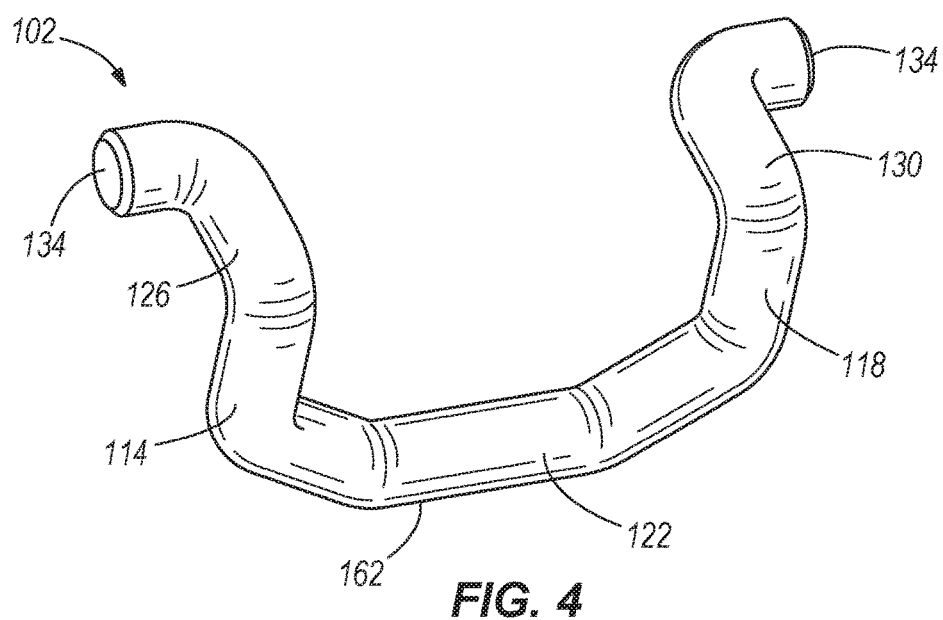
FIG. 4 is a perspective view of a finger guard of the finger guard assembly of FIG. 3.

Referring to FIG. 4, a first mounting extension 126 is coupled to the first leg 114, and a second mounting extension 130 is coupled to the second leg 118. Each of the first mounting extension 126 and the second mounting extension 130 includes a mounting boss 134. The guard member 102 may be formed of substantially rigid material such as a metal and is preferably coated or covered with a resilient material such as rubber or plastic. In other constructions, a resilient polymer or other material is used to form the guard member 102.

Referring to FIG. 3, the guard support member 106 is molded over the first mounting extension 126 and the second mounting extension 130 of the guard member 102, such that the exposed portions 110 of the guard member 102 extend from a forward surface 138 of the guard support member 106. The mounting bosses 134 extend outwardly from lateral edges 142 of the guard support member 106. In other constructions, other methods are used to connect the guard support member 106 and the guard member 102 (e.g., thermal bonding, adhesives, fasteners, etc.).

The guard support member 106 further includes a fastener boss 146. Referring to FIG. 2, the fastener boss 146 defines an aperture 150 for receiving a fastener 154 for coupling the guard support member 106 to the housing assembly 18. The boss 134 of each mounting extension 126 and 130 of the guard member 102 are received by corresponding recesses 158 (FIG. 1) formed in the housing assembly 18. The guard support member 106 may be formed of a resilient polymer or rubber material, such that the guard support member 106 provides a degree of impact resistance between the guard member 102 and the housing assembly 18 when the guard member 102 is struck by the hook member 26 or the tape measure 10 is dropped upon the guard member 102. Additionally, the guard support member 106 can rotate relative to the housing assembly 18 about the fastener 154 (FIG. 2) when an impact is received by the guard member 102.

Referring to FIG. 4, the guard member 102, and more specifically the connecting leg 122, is configured to engage the hook member 26 when the measuring tape 14 is fully retracted into the internal cavity 62 (FIG. 1). The guard member 102 also shields the housing assembly 18 from being struck by the hook member 26. In addition, a lower surface 162 of the guard member 102 is substantially aligned with the support leg 74, thereby allowing the tape measure 10 to stand upright on a surface to be measured as shown in FIG. 1.

Thus, the invention provides, among other things, a tape measure and more specifically a tape measure with a guard member. Although the invention has been described in detail with reference to certain preferred embodiments, variations and modifications exist within the scope and spirit of one or more independent aspects of the invention as described.

The invention claimed is:

1. A tape measure comprising:
a housing assembly including a first side wall, a second side wall and a peripheral wall connecting the first side wall and the second side wall, the housing assembly defining an internal cavity;
a port disposed within the peripheral wall of the housing assembly;
a spool disposed within the internal cavity of the housing assembly, the spool defining an axis of rotation;
a measuring tape at least partially disposed within the internal cavity of the housing assembly and extending through the port, the measuring tape rotatably coupled to the spool;
a hook member fixed to an end portion of the measuring tape, the measuring tape movable between a retracted position in which the hook member is positioned proximate the port and an extended position in which the hook member is positioned away from the port;
a retraction mechanism coupled to the spool, the retraction mechanism configured to bias the measuring tape towards the retracted position; and
a finger guard assembly including a guard member and a guard support, the guard support coupled to the housing assembly and supporting the guard member, the guard member positioned between the port and the hook member.

2. The tape measure of claim 1, wherein the hook member contacts the guard member when the measuring tape is in the retracted position.

3. The tape measure of claim 1, wherein the guard member is positioned at a distance from the port such that a space is formed between the port and the guard member.

4. The tape measure of claim 3, wherein the measuring tape extends through the guard member.

5. The tape measure of claim 3, wherein the measuring tape is outside of the internal cavity when extending through the space formed between the port and the guard member.

6. The tape measure of claim 1, wherein the guard member has a U-shape defined by a first leg, a second leg, and a connecting leg extending between the first leg and the second leg.

7. The tape measure of claim 6, wherein the first leg and the second leg each include a mounting extension and a mounting boss.

8. The tape measure of claim 7, wherein the guard support is molded over the mounting extensions.

9. The tape measure of claim 7, wherein the guard support includes two recesses for receiving the mounting bosses of the first leg and the second leg.

10. The tape measure of claim 1, wherein the housing assembly defines a front surface and a bottom portion, and wherein the tape port is formed in the bottom portion and is spaced apart from the front surface.

11. The tape measure of claim 10, wherein the finger guard assembly includes a portion that is substantially flush with the front face.

12. The tape measure of claim 1, wherein the retraction mechanism includes a spring.

13. The tape measure of claim 1, further including a tape lock configured to selectively engage the measuring tape such that the measuring tape remains in the extended position.

14. The tape measure of claim 1, wherein the guard member is formed of a substantially rigid material.

15. The tape measure of claim 14, wherein the guard member is coated with a resilient material.

16. The tape measure of claim 1, wherein the guard member is formed of a resilient polymer.

17. The tape measure of claim 1, further including a support leg extending from a lower portion of the peripheral wall.

18. The tape measure of claim 17, wherein a lower surface of the guard member is substantially aligned with the support leg to support the tape measure on a surface to be measured.

19. A tape measure comprising:
a housing arranged to enclose an internal cavity, the housing defining a front wall;
a port formed in the housing and spaced a non-zero distance from the front wall;
a measuring tape at least partially disposed within the internal cavity of the housing and extending through the port, the measuring tape rotatably coupled to the housing; and
a finger guard assembly positioned adjacent the front wall, the finger guard assembly cooperating with the port to define a space therebetween, the measuring tape passing through the space outside of the housing to facilitate the control of the retraction and extension of the measuring tape through contact within the space.

20. The tape measure of claim 19, further comprising a hook member disposed on a free end of the measuring tape, the hook member engaging the finger guard assembly to prevent retraction of the hook member into the space.

\* \* \* \* \*